(12) United States Patent
Tuccelli et al.

(10) Patent No.: US 9,777,847 B2
(45) Date of Patent: Oct. 3, 2017

(54) CIRCUIT FOR BIOLOGICAL LIQUID COMPRISING A PINCH VALVE

(71) Applicant: EMD Millipore Corporation, Billerica, MA (US)

(72) Inventors: Ronald Tuccelli, Winchester, MA (US); Sebastien Cirou, Schiltigheim (FR); Virginie Buisson, Neuvecelle (FR); Christine Abouayad El Idrissi, Eschau (FR); Jim Kelly, Melrose, MA (US)

(73) Assignee: EMD Millipore Corporation, Billerica, MA (US)

( * ) Notice: Subject to any disclaimer, the term of this patent is extended or adjusted under 35 U.S.C. 154(b) by 0 days.

(21) Appl. No.: 14/413,556

(22) PCT Filed: Jul. 18, 2013

(86) PCT No.: PCT/IB2013/055925
§ 371 (c)(1),
(2) Date: Jan. 8, 2015

(87) PCT Pub. No.: WO2014/016742
PCT Pub. Date: Jan. 30, 2014

(65) Prior Publication Data
US 2015/0204450 A1    Jul. 23, 2015

(30) Foreign Application Priority Data

Jul. 23, 2012    (FR) ...................................... 12 57127

(51) Int. Cl.
*F16K 7/04*    (2006.01)
*F16K 7/06*    (2006.01)
(Continued)

(52) U.S. Cl.
CPC ................ *F16K 7/06* (2013.01); *B01L 3/561* (2013.01); *B01L 3/565* (2013.01); *B01L 3/567* (2013.01);
(Continued)

(58) Field of Classification Search
CPC ..... B01L 2400/0655; B01L 2300/0887; B01L 3/502753; B01L 2200/0689;
(Continued)

(56) References Cited

U.S. PATENT DOCUMENTS

| | | |
|---|---|---|
| 2,413,853 A | 1/1947 | Zademach et al. |
| 2,787,403 A | 4/1957 | Carr et al. |

(Continued)

FOREIGN PATENT DOCUMENTS

| | | |
|---|---|---|
| CN | 101281204 A | 10/2008 |
| DE | 102006059459 A1 | 7/2008 |

(Continued)

OTHER PUBLICATIONS

International Search Report and Written Opinion mailed Dec. 5, 2013 in corresponding PCT application No. PCT/IB2013/055925.
(Continued)

*Primary Examiner* — Umashankar Venkatesan
(74) *Attorney, Agent, or Firm* — Nields, Lemack & Frame, LLC

(57) ABSTRACT

The invention concerns a circuit comprising a bag (11) comprising two flexible films (45, 46) and a press (10) comprising a first (14) and a second (13) shell clamping the bag to form pipes having a passage and edges (41); the first shell comprising a valve (20) which comprises a movable member (24) and a pad (31), which pad has a resting configuration in which a second face (33) of the pad is concave and locally delimits a channel (18) and a pinching configuration in which the second face (33) is convex; said
(Continued)

movable member and said pad being configured so that, when said valve is in closed position and said pad in pinching configuration, said passage is pinched by said movable member against said second shell channel and said edges (41) are pinched flat by said movable member against said second shell (13).

25 Claims, 6 Drawing Sheets

(51) Int. Cl.
- *B01L 3/00* (2006.01)
- *B01L 99/00* (2010.01)
- *F16K 7/12* (2006.01)
- *B29C 49/00* (2006.01)
- *B29L 31/14* (2006.01)

(52) U.S. Cl.
CPC .............. *B01L 99/00* (2013.01); *F16K 7/123* (2013.01); *B01L 3/502753* (2013.01); *B01L 2200/0689* (2013.01); *B01L 2300/0816* (2013.01); *B01L 2300/0861* (2013.01); *B01L 2300/0887* (2013.01); *B01L 2400/0655* (2013.01); *B29C 49/0047* (2013.01); *B29L 2031/14* (2013.01); *Y10T 137/85954* (2015.04)

(58) Field of Classification Search
CPC ..... B01L 2300/0861; B01L 2300/0816; B01L 99/00; B01L 3/567; B01L 3/561; B01L 3/565; B29C 49/0047; F16K 7/123; F16K 7/06; Y10T 137/85954; B29L 2031/14
USPC .................. 251/17, 7; 417/479; 604/29, 28; 137/565.01
See application file for complete search history.

(56) References Cited

U.S. PATENT DOCUMENTS

| | | |
|---|---|---|
| 2,941,575 A | 6/1960 | Malmberg et al. |
| 2,943,738 A | 7/1960 | Schmidt, Jr. |
| 3,022,229 A | 2/1962 | Heden |
| 3,179,117 A | 4/1965 | Gibson et al. |
| 3,527,572 A | 9/1970 | Urkiewicz |
| 3,667,487 A | 6/1972 | Schoenbeck et al. |
| 3,772,154 A | 11/1973 | Isenberg et al. |
| 3,774,762 A | 11/1973 | Lichtenstein |
| 3,845,765 A | 11/1974 | Ikeda |
| 4,113,623 A | 9/1978 | Koether et al. |
| 4,198,972 A | 4/1980 | Herb |
| 4,285,464 A | 8/1981 | Latham |
| 4,332,750 A | 6/1982 | Roggenburg et al. |
| 4,370,983 A | 2/1983 | Lichtenstein |
| 4,466,888 A | 8/1984 | Verkaart |
| 4,610,781 A | 9/1986 | Bilstad et al. |
| 4,775,360 A | 10/1988 | Lane et al. |
| 4,784,751 A | 11/1988 | McGehee |
| 4,790,118 A | 12/1988 | Chilcoate |
| 4,852,851 A | 8/1989 | Webster |
| 4,855,236 A | 8/1989 | Levin |
| 4,915,119 A | 4/1990 | Franklin |
| 5,019,257 A | 5/1991 | Suzuki et al. |
| 5,061,236 A | 10/1991 | Sutherland et al. |
| 5,141,866 A | 8/1992 | Levin |
| 5,265,912 A | 11/1993 | Natividad |
| 5,290,518 A | 3/1994 | Johnson |
| 5,306,420 A | 4/1994 | Bisconte |
| 5,324,422 A | 6/1994 | Colleran et al. |
| 5,342,463 A | 8/1994 | Addeo et al. |
| 5,520,885 A | 5/1996 | Coelho et al. |
| 5,628,908 A | 5/1997 | Kamen et al. |
| 5,645,723 A | 7/1997 | Fujishiro et al. |
| 5,678,568 A | 10/1997 | Uchikubo et al. |
| 5,711,916 A | 1/1998 | Riggs et al. |
| 5,738,645 A | 4/1998 | Plotkin |
| 5,985,653 A | 11/1999 | Armstrong et al. |
| 6,073,942 A | 6/2000 | Heneveld |
| 6,099,734 A | 8/2000 | Boggs et al. |
| 6,129,099 A | 10/2000 | Foster et al. |
| 6,146,124 A | 11/2000 | Coelho et al. |
| 6,186,998 B1 | 2/2001 | Inuzuka et al. |
| 6,213,334 B1 | 4/2001 | Coelho et al. |
| 6,228,255 B1 | 5/2001 | Peterson et al. |
| 6,232,115 B1 | 5/2001 | Coelho et al. |
| 6,303,025 B1 | 10/2001 | Houchens |
| 6,361,642 B1 | 3/2002 | Bellamy et al. |
| 6,670,169 B1 | 12/2003 | Schoeb et al. |
| 6,764,761 B2 | 7/2004 | Eu et al. |
| 6,808,675 B1 | 10/2004 | Coelho et al. |
| 6,818,185 B1 | 11/2004 | Petersen et al. |
| 6,868,987 B2 | 3/2005 | Hedington et al. |
| 6,902,706 B1 | 6/2005 | Colin et al. |
| 6,982,063 B2 | 1/2006 | Hamel et al. |
| 7,115,205 B2 | 10/2006 | Robinson et al. |
| 7,153,286 B2 | 12/2006 | Busby et al. |
| 7,326,355 B2 | 2/2008 | Graetz et al. |
| 7,458,560 B2 * | 12/2008 | Muller .................... F16K 7/123 251/331 |
| 7,485,224 B2 | 2/2009 | Jones et al. |
| 7,648,627 B2 | 1/2010 | Beden et al. |
| 7,666,602 B2 | 2/2010 | Ammann et al. |
| 7,867,189 B2 | 1/2011 | Childers et al. |
| 7,935,074 B2 | 5/2011 | Plahey et al. |
| 7,935,253 B2 | 5/2011 | Beulay et al. |
| 8,114,276 B2 | 2/2012 | Childers et al. |
| 8,163,172 B2 | 4/2012 | Beulay et al. |
| 8,343,356 B2 | 1/2013 | Beulay et al. |
| 8,383,397 B2 | 2/2013 | Wojciechowski et al. |
| 8,499,794 B2 | 8/2013 | Takahashi et al. |
| 8,505,959 B2 | 8/2013 | Darling |
| 8,506,798 B2 | 8/2013 | Beulay et al. |
| 8,557,113 B2 | 10/2013 | Beulay et al. |
| 8,900,454 B2 | 12/2014 | Cirou et al. |
| 8,906,229 B2 | 12/2014 | Cirou et al. |
| 8,916,045 B2 | 12/2014 | Reinbigler et al. |
| 8,921,096 B2 | 12/2014 | Weissenbach et al. |
| 9,051,929 B2 | 6/2015 | Cirou et al. |
| 9,171,145 B2 | 10/2015 | Dash et al. |
| 9,174,145 B2 | 11/2015 | Weissenbach et al. |
| 9,174,171 B2 | 11/2015 | Weissenbach et al. |
| 9,181,941 B2 | 11/2015 | Cirou et al. |
| 9,205,955 B2 | 12/2015 | Cirou et al. |
| 9,259,687 B2 | 2/2016 | Weissenbach et al. |
| 9,259,733 B2 | 2/2016 | Tuccelli et al. |
| 9,523,072 B2 | 12/2016 | Reinbigler et al. |
| 9,528,085 B2 | 12/2016 | Reinbigler et al. |
| 2002/0147423 A1 | 10/2002 | Burbank et al. |
| 2003/0040104 A1 | 2/2003 | Barbera-Guillem |
| 2003/0199803 A1 | 10/2003 | Robinson et al. |
| 2004/0031507 A1 | 2/2004 | Ross et al. |
| 2004/0031756 A1 | 2/2004 | Suzuki et al. |
| 2004/0104153 A1 | 6/2004 | Yang |
| 2004/0222341 A1 | 11/2004 | Breda et al. |
| 2004/0259240 A1 | 12/2004 | Fadden |
| 2005/0254879 A1 | 11/2005 | Gundersen et al. |
| 2006/0024212 A1 | 2/2006 | Hwang |
| 2006/0057030 A1 | 3/2006 | Lee et al. |
| 2006/0118472 A1 | 6/2006 | Schick et al. |
| 2006/0226333 A1 | 10/2006 | Newkirk |
| 2007/0095364 A1 | 5/2007 | Watt |
| 2007/0112297 A1 | 5/2007 | Plahey et al. |
| 2007/0128087 A1 | 6/2007 | Cannizzaro et al. |
| 2007/0199875 A1 | 8/2007 | Moorey et al. |
| 2007/0278155 A1 | 12/2007 | Lo et al. |
| 2008/0023045 A1 | 1/2008 | Miller et al. |
| 2008/0057274 A1 | 3/2008 | Hagiwara et al. |
| 2008/0213143 A1 | 9/2008 | Gyonouchi et al. |
| 2008/0254962 A1 | 10/2008 | Mizuo et al. |
| 2009/0011179 A1 | 1/2009 | Kikuchi et al. |
| 2009/0042293 A1 | 2/2009 | Hata et al. |
| 2009/0050756 A1 | 2/2009 | Newkirk et al. |
| 2009/0101219 A1 | 4/2009 | Martini et al. |

(56) References Cited

U.S. PATENT DOCUMENTS

| | | |
|---|---|---|
| 2009/0101552 A1 | 4/2009 | Fulkerson et al. |
| 2009/0111179 A1 | 4/2009 | Hata et al. |
| 2009/0180933 A1 | 7/2009 | Kauling et al. |
| 2009/0215602 A1 | 8/2009 | Min et al. |
| 2009/0294349 A1 | 12/2009 | Beulay et al. |
| 2009/0314970 A1 | 12/2009 | McAvoy et al. |
| 2010/0108920 A1 | 5/2010 | Tatarek |
| 2010/0126927 A1 | 5/2010 | Blankenstein et al. |
| 2010/0187167 A1 | 7/2010 | Reinbigler et al. |
| 2010/0204765 A1 | 8/2010 | Hall et al. |
| 2010/0206785 A1 | 8/2010 | Beulay et al. |
| 2010/0234805 A1 | 9/2010 | Kaufmann et al. |
| 2011/0174716 A1 | 7/2011 | Beulay et al. |
| 2011/0297866 A1 | 12/2011 | Weber |
| 2011/0303306 A1 | 12/2011 | Weber |
| 2011/0315611 A1 | 12/2011 | Fulkerson et al. |
| 2012/0006736 A1 | 1/2012 | Cirou et al. |
| 2012/0018018 A1* | 1/2012 | Cirou ............... B01L 3/502738 137/565.01 |
| 2012/0031510 A1 | 2/2012 | Weissenbach et al. |
| 2012/0053520 A1 | 3/2012 | Kirkpatrick |
| 2012/0138173 A1 | 6/2012 | Cirou et al. |
| 2012/0138522 A1 | 6/2012 | Cirou et al. |
| 2012/0145616 A1 | 6/2012 | Weissenbach et al. |
| 2012/0160342 A1 | 6/2012 | Weissenbach et al. |
| 2012/0160356 A1 | 6/2012 | Reinbigler et al. |
| 2012/0168390 A1 | 7/2012 | Beulay et al. |
| 2012/0248025 A1 | 10/2012 | Reinbigler et al. |
| 2012/0284991 A1 | 11/2012 | Kusz et al. |
| 2013/0087490 A1 | 4/2013 | Beulay et al. |
| 2013/0193073 A1 | 8/2013 | Hogard et al. |
| 2013/0210130 A1 | 8/2013 | Larcher et al. |
| 2013/0236130 A1 | 9/2013 | Cirou et al. |
| 2013/0240065 A1 | 9/2013 | Weissenbach et al. |
| 2013/0292319 A1 | 11/2013 | Fulkerson et al. |
| 2014/0069537 A1 | 3/2014 | Cirou et al. |
| 2014/0112828 A1 | 4/2014 | Grant et al. |
| 2014/0263062 A1 | 9/2014 | Updyke et al. |
| 2015/0008184 A1 | 1/2015 | Cirou et al. |
| 2015/0013773 A1 | 1/2015 | Cirou et al. |
| 2015/0083320 A1 | 3/2015 | Putnam |
| 2015/0190809 A1 | 7/2015 | Tuccelli et al. |
| 2016/0264923 A1 | 9/2016 | Reinbigler et al. |

FOREIGN PATENT DOCUMENTS

| | | | |
|---|---|---|---|
| DE | 102008003823 A1 | 7/2008 | |
| EP | 0479047 A2 | 4/1992 | |
| EP | 0803723 A1 | 10/1997 | |
| EP | 1195171 A2 | 4/2002 | |
| EP | 1239277 A1 | 9/2002 | |
| EP | 2044964 A2 | 4/2009 | |
| EP | 2130903 A1 | 12/2009 | |
| EP | 2208534 A1 | 7/2010 | |
| EP | 2210666 A1 | 7/2010 | |
| EP | 2228635 A1 | 9/2010 | |
| FR | 2241615 A1 | 3/1975 | |
| FR | 2673853 A1 | 9/1992 | |
| FR | 2931838 A1 | 12/2009 | |
| FR | 2940145 A1 | 6/2010 | |
| FR | 2955119 A1 * | 7/2011 | ........ B01L 3/502738 |
| FR | 2960796 A1 | 12/2011 | |
| FR | 2961711 A1 | 12/2011 | |
| GB | 1434786 A | 5/1976 | |
| GB | 2448858 A | 11/2008 | |
| JP | 62-081543 A | 4/1987 | |
| JP | 2010-502405 A | 1/2010 | |
| WO | 93/03295 A1 | 2/1993 | |
| WO | 94/05346 A1 | 3/1994 | |
| WO | 00/48703 A1 | 8/2000 | |
| WO | 2005/090403 A2 | 9/2005 | |
| WO | 2006/043895 A1 | 4/2006 | |
| WO | 2007/094254 A1 | 8/2007 | |
| WO | 2008/033788 A2 | 3/2008 | |
| WO | 2008/064242 A2 | 5/2008 | |
| WO | 2008/071351 A1 | 6/2008 | |
| WO | 2008/120021 A1 | 10/2008 | |
| WO | 2009/017614 A1 | 2/2009 | |
| WO | 2009/073567 A1 | 6/2009 | |
| WO | 2009/157852 A1 | 12/2009 | |
| WO | 2010/084432 A1 | 7/2010 | |
| WO | 2010/094249 A1 | 8/2010 | |
| WO | 2011/161609 A1 | 12/2011 | |

OTHER PUBLICATIONS

International Preliminary Report on Patentability mailed Feb. 5, 2015 in corresponding PCT application No. PCT/IB2013/055925.
Notice of Allowance mailed Sep. 30, 2016 in co-pending U.S. Appl. No. 12/685,140.
Notice of Allowance mailed Sep. 27, 2016 in co-pending U.S. Appl. No. 13/414,843.
French Search Report dated Feb. 9, 2009 in co-pending French patent application No. 0853629.
European communication dated May 17, 2010 in co-pending European patent application No. 10290005.7.
French Search Report dated Oct. 16, 2009 in co-pending French Patent Application No. 0950435.
Chinese Communication, with English translation, dated Sep. 27, 2012 in co-pending Chinese patent application No. 201010004496.1.
International Search Report and Written Opinion mailed May 7, 2010 in co-pending PCT application No. PCT/IB2010/050102.
International Preliminary Report on Patentability issued Aug. 4, 2011 in co-pending PCT application No. PCT/IB2010/050102.
French Search Report dated Sep. 24, 2010 in co-pending French patent application No. 1050209.
French Search Report dated Nov. 25, 2010 in co-pending French patent application No. 1054514.
Korean communication, with English translation, dated Jul. 31, 2014 in co-pending Korean patent application No. 10-2013-7000355.
French Search Report dated Nov. 12, 2010 in co-pending French patent application No. 1055025.
Korean communication, with English translation, dated Jul. 31, 2014 in co-pending Korean patent application No. 10-2013-7001692.
French Search Report dated Feb. 3, 2011 in co-pending French patent application No. 1055026.
French Search Report dated May 24, 2011 in co-pending French patent application No. 1056421.
European communication dated Apr. 6, 2010 in co-pending European patent application No. 09290938.1.
French Search Report dated Nov. 22, 2010 in co-pending French patent application No. 1054517.
Korean communication, with English translation, dated Jul. 31, 2014 in co-pending Korean patent application No. 10-2013-7000366.
French Search Report dated Nov. 22, 2010 in co-pending French patent application No. 1054516.
Korean communication, with English translation, dated Jul. 31, 2014 in co-pending Korean patent application No. 10-2013-7000356.
French Search Report dated Nov. 17, 2011 in co-pending French patent application No. 1152556.
International Search Report mailed Jun. 8, 2011 in co-pending PCT Application No. PCT/IB2011/050089.
Written Opinion of the International Searching Authority mailed Jun. 8, 2011 in co-pending PCT application No. PCT/IB2011/050089.
International Preliminary Report on Patentability mailed Jul. 26, 2012 in co-pending PCT application No. PCT/IB2011/050089.
International Search Report and Written Opinion mailed Sep. 30, 2011 in co-pending PCT Application No. PCT/IB2011/052447.
International Preliminary Report on Patentability mailed Dec. 20, 2012 in co-pending PCT application No. PCT/IB2011/052447.

(56) References Cited

OTHER PUBLICATIONS

International Search Report mailed Sep. 29, 2011 in co-pending PCT Application No. PCT/IB2011/052676.
Written Opinion of the International Searching Authority mailed Sep. 29, 2011 in co-pending PCT application No. PCT/IB2011/052676.
International Preliminary Report on Patentability mailed Jan. 10, 2013 in co-pending PCT application No. PCT/IB2011/052676.
International Search Report mailed Aug. 29, 2011 in co-pending PCT Application No. PCT/IB2011/052679.
Written Opinion of the International Searching Authority mailed Aug. 29, 2011 in co-pending PCT application No. PCT/IB2011/052679.
International Preliminary Report on Patentability mailed Jan. 10, 2013 in co-pending PCT application No. PCT/IB2011/052679.
International Search Report mailed Aug. 2, 2011 in co-pending PCT Application No. PCT/IB2011/052448.
Written Opinion of the International Searching Authority mailed Aug. 2, 2011 in co-pending PCT application No. PCT/IB2011/052448.
International Preliminary Report on Patentability mailed Dec. 20, 2012 in co-pending PCT application No. PCT/IB2011/052448.
International Search Report and Written Opinion mailed Sep. 28, 2011 in co-pending PCT Application No. PCT/IB2011/052450.
International Preliminary Report on Patentability mailed Dec. 20, 2012 in co-pending PCT application No. PCT/IB2011/052450.
International Search Report mailed Sep. 4, 2012 in co-pending PCT application No. PCT/IB2012/051424.
International Search Report and Written Opinion mailed Nov. 8, 2013 in co-pending PCT application No. PCT/IB2013/055926.
International Preliminary Report on Patentability mailed Feb. 5, 2015 in co-pending PCT application No. PCT/IB2013/055926.
Millipore, "Process Containers," published at <http://www.millipore.com/bioproduction/bp3/containers>, available on Apr. 5, 2008, 2 pages.
Office Action—Restriction—mailed Jan. 27, 2012 in co-pending U.S. Appl. No. 12/685,140.
Office Action mailed Jun. 28, 2012 in co-pending U.S. Appl. No. 12/685,140.
Final Rejection mailed Jan. 24, 2013 in co-pending U.S. Appl. No. 12/685,140.
Office Action mailed Dec. 17, 2013 in co-pending U.S. Appl. No. 12/685,140.
Final Rejection mailed Jun. 23, 2014 in co-pending U.S. Appl. No. 12/685,140.
Office Action mailed Jan. 6, 2015 in co-pending U.S. Appl. No. 12/685,140.
Final Rejection mailed Aug. 19, 2015 in co-pending U.S. Appl. No. 12/685,140.
Notice of Allowance mailed Apr. 6, 2016 in co-pending U.S. Appl. No. 12/685,140.
Notice of Allowance mailed Jul. 1, 2016 in co-pending U.S. Appl. No. 12/685,140.
Office Action mailed Dec. 11, 2014 in co-pending U.S. Appl. No. 13/414,843.
Final Rejection mailed Feb. 5, 2015 in co-pending U.S. Appl. No. 13/414,843.
Office Action mailed Aug. 7, 2015 in co-pending U.S. Appl. No. 13/414,843.
Final rejection mailed Feb. 22, 2016 in co-pending U.S. Appl. No. 13/414,843.
Notice of Allowance mailed Jun. 20, 2016 in co-pending U.S. Appl. No. 13/414,843.
Notice of Allowance mailed Jul. 11, 2016 in co-pending U.S. Appl. No. 13/414,843.
Office action mailed Mar. 9, 2016 in co-pending U.S. Appl. No. 13/872,248.
Final rejection mailed Jun. 16, 2016 in co-pending U.S. Appl. No. 13/872,248.
Office action mailed Nov. 2, 2016 in co-pending U.S. Appl. No. 13/872,248.
Office action mailed Jan. 26, 2017 in co-pending U.S. Appl. No. 14/493,858.
Final rejection mailed Feb. 8, 2017 in co-pending U.S. Appl. No. 13/872,248.
Office action mailed Jan. 25, 2017 in co-pending U.S. Appl. No. 14/493,678.
Office Action dated Jun. 8, 2017 in co-pending U.S. Appl. No. 13/872,248.
Notice of allowance dated May 23, 2017 in co-pending U.S. Appl. No. 14/493,858.
Advisory action dated Apr. 18, 2017 dated Apr. 8, 2017 in co-pending U.S. Appl. No. 13/872,248.
Notice of allowance dated May 15, 2017 in co-pending U.S. Appl. No. 14/493,678.

* cited by examiner

CIRCUIT FOR BIOLOGICAL LIQUID COMPRISING A PINCH VALVE

The invention relates to circuits for biological liquid, in particular but not exclusively, for purifying a biopharmaceutical liquid in order to obtain a product such as monoclonal antibodies, vaccines or recombinant proteins.

It is known that biopharmaceutical liquids are in general obtained by culture in a bioreactor and that they must then be treated to achieve the required characteristics of purity, concentration, absence of viruses, etc.

These treatments are conventionally carried out in dedicated installations comprising stainless steel pipes and other parts such as tanks or filter housings, which necessitate operations before and after the actual treatment, which are relatively onerous, in particular operations of cleaning after use.

Within the last few years, these treatments have alternatively been carried out in installations in which the components in contact with the liquid are single-use components.

Such single-use components have the advantage of avoiding cleaning operations, but, to provide the required degree of security, the implementation of an installation with such components necessitates operations of selection, assembly and verification which are relatively complex.

This is especially the case when the number of pipes and other circuit components, for example connectors and pinch valves, is high and/or when the operating pressure is high.

From French patent application FR 2 955 119 a circuit for biological liquid is known, comprising a plurality of connectors and a network for routing liquid between the connectors.

This circuit further comprises a bag comprising two flexible films and the routing network connectors, and a press comprising a first shell and a second shell clamping the bag in a state in which pipes of the liquid routing network are formed between the films.

The first shell comprises for each said pipe a shaping channel and the second shell comprises for each pipe a shaping channel facing the corresponding shaping channel of the first shell.

The first shell further comprises pinch valves, which each comprise an actuator having a movable pinching member, and each has an open position in which the moveable member is in a retracted position in which it does not pinch the pipe, as well as a closed position in which the moveable member is in an extended position in which it pinches the pipe.

Each valve further comprises, in register with the moveable pinching member, an elastically compressible pad having a first face adjacent the moveable member and a second face adjacent the pipe to pinch, and, when the valve is in an open position, having a resting configuration in which the second face is concave and locally delimits the first shell shaping channel of the pipe to pinch, and, when the valve is in a closed position, a pinching configuration in which the second face is convex and in which the pipe and the pad are sandwiched between the second shell shaping channel of the pipe to pinch and the moveable pinching member.

Such circuits are greatly appreciated since the pinch valves enable the pipes of the circuit to be obturated properly.

The invention aims to provide a circuit having an even better quality of obturation of the pipes by pinch valves, in a simple, economical and convenient manner.

The invention thus concerns a circuit for biological liquid, comprising a plurality of connectors, a network for routing liquid between said connectors, a bag comprising two flexible films and said routing network connectors, and a press comprising a first shell and a second shell clamping said bag in a state in which pipes of said liquid routing network are formed between said films, said first shell comprising for each said pipe a shaping channel, said second shell comprising for each said pipe a shaping channel facing said corresponding shaping channel of the first shell; said first shell comprising at least one pinch valve for a said pipe, which valve comprises an actuator comprising a movable pinching member and has an open position in which the moveable member is in a retracted position in which it does not pinch said pipe as well as a closed position in which the moveable member is in an extended position in which it pinches said pipe; said valve further comprising, in register with said moveable pinching member, an elastically compressible pad, which pad has a first face adjacent the moveable member and a second face adjacent the pipe to pinch, and, when said valve is in an open position, has a resting configuration in which said second face is concave and locally delimits said first shell shaping channel of said pipe to pinch, and, when said valve is in a closed position, has a pinching configuration in which said second face is convex, with said pipe and said pad sandwiched between said second shell shaping channel of said pipe to pinch and said moveable pinching member.

characterized in that said pipe to pinch has a routing passage for said biological liquid and edges formed on each side of said passage delimiting the latter; said movable pinching member and said elastically compressible pad being configured such that, when said pinch valve is in a closed position and said pad in a pinching configuration, said routing passage of said pipe to pinch is pinched by said movable pinching member against said second shell shaping channel and said edges of said pipe to pinch are pinched flat by said movable pinching member against said second shell.

In the circuit according to the invention, two films of the pipe as well as the elastically compressible pad are sandwiched.

It will be noted that in the circuit according to the invention, both the passage and the edges of the pipe are sandwiched, or pinched, by the pinch valve.

More particularly, the passage of that pipe is pinched by the movable pinching member of the pinch valve against the second shell shaping channel, the elastically compressible pad being interposed between that movable pinching member and that second shell shaping channel; while the edges of the passage are each pinched flat by the movable pinching member of the pinch valve against the second shell, in other words outside its shaping channel, with it also being possible for the elastically compressible pad to be interposed between that movable pinching member and that second shell, that movable pinching member also being outside the shaping channel of the pipe to pinch.

By virtue of the circuit according to the invention both films of the pipe are applied sealingly against each other at the location of its passage, and no biological liquid can flow in the pinched portion of pipe, with no risk of pulling away of said pipe at the location of its edges since they are pinched flat, between the movable member and the second shell, outside of its shaping channel.

The fact of pinching flat the edges of the pipe at the same time as pinching the passage of the pipe against the shaping channel of the second shell makes it possible to limit the stretching of the films forming the bag at the location of the edges, so avoiding pulling away of the bag at the location of a pipe. This is particularly important in view of the use of the circuit according to the invention in which particularly costly biological liquids may flow.

It should be noted that, thanks to its compressibility, the elastically compressible pad makes it possible to make up differences in shape between a first distal end of the movable member of the pinch valve actuator and the shaping channel of the second shell (pinching of the passage) and a second distal end of that movable member and the second shell (pinching flat of the edges). There is thus no need for the matching of shapes to be perfect between the first and second distal ends of said movable member and respectively said second shell shaping channel and the second shell itself.

According to preferred features of the circuit according to the invention that are simple, convenient and economical:

said passage of said pipe to pinch has an elliptical outline and both said flexible films meet and are sealed to each other at the location of said edges of said passage.

said pad forms part of an individual local plate;

said pad forms a central portion of said individual local plate, which comprises lateral and transverse walls which surround said central portion;

said lateral walls are flat whereas said central portion and said transverse walls are arcuately curved, with said transverse walls having a first section referred to as wide and said central portion which has a second section referred to as smaller relative to said first section.

said second shell shaping channel of said pipe to pinch has a central portion of smaller cross-section opposite said central portion of said individual local plate and two lateral portions of wide cross-section formed on respective opposite sides of said smaller cross-section central portion and opposite said transverse walls of said individual local plate.

said individual local plate comprises several transverse walls which meet at the location of a distinct junction of said central portion;

said first shell comprises a recessed accommodation configured to receive said pad at least partially;

said individual local plate comprises at least one fastening device fastened by shape complementarity in at least one corresponding aperture provided in the recessed accommodation of said first shell;

said individual local plate comprises two fastening lugs forming said fastening device, said fastening lugs projecting from the transverse walls;

said individual local plate comprises a peripheral curb forming said fastening device, said curb being provided with a periphery on which is formed at least one positioning rib;

said pad is formed from elastically compressible flexible plastic molded in one piece, in particular of silicone;

said movable pinching member of said actuator comprises a finger having a first distal end shaped like the second shell shaping channel and a second distal end shaped like said second shell, outside of and in immediate proximity to said second shell shaping channel, said finger being configured to push said pad and said passage of said pipe towards said second shell shaping channel and said edges of said pipe towards said second shell, outside of and in immediate proximity to said second shell shaping channel;

said finger comprises a body provided with a pointed end shaped to pinch said passage of said pipe as well as at least one pinching arm which extends laterally along said body and which is provided with a flat end shaped to pinch flat said edges of said pipe;

said finger further comprises at least one lateral pinching wall which extends along said body and which is provided with a beveled end meeting said pointed end of said body;

said finger further comprises a base from which extends said body, at the location of an opposite end of said body to said pointed end, said at least one pinching arm and/or said at least one lateral pinching wall resting on said base; and said first shell comprises a window opening into a recessed accommodation formed in said first shell, said window being configured to allow said movable pinching member to pass when the latter is in its extended position.

The disclosure of the invention will now be continued with the description of an example embodiment, given below by way of illustrative and non-limiting example, with reference to the accompanying drawings, in which.

Figure 1:
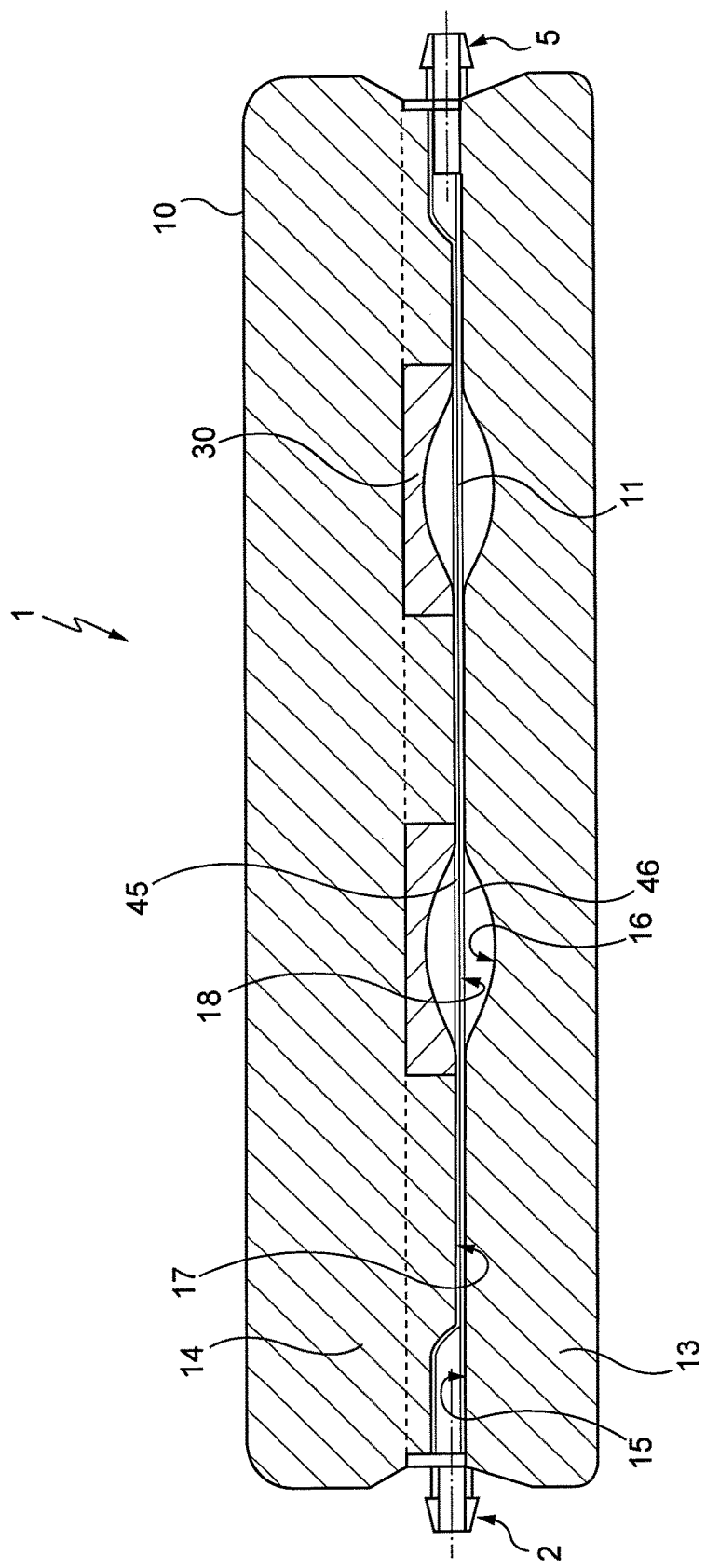
FIG. 1 is a diagrammatic view of a circuit for biological liquid in accordance with invention.
Figure 2:
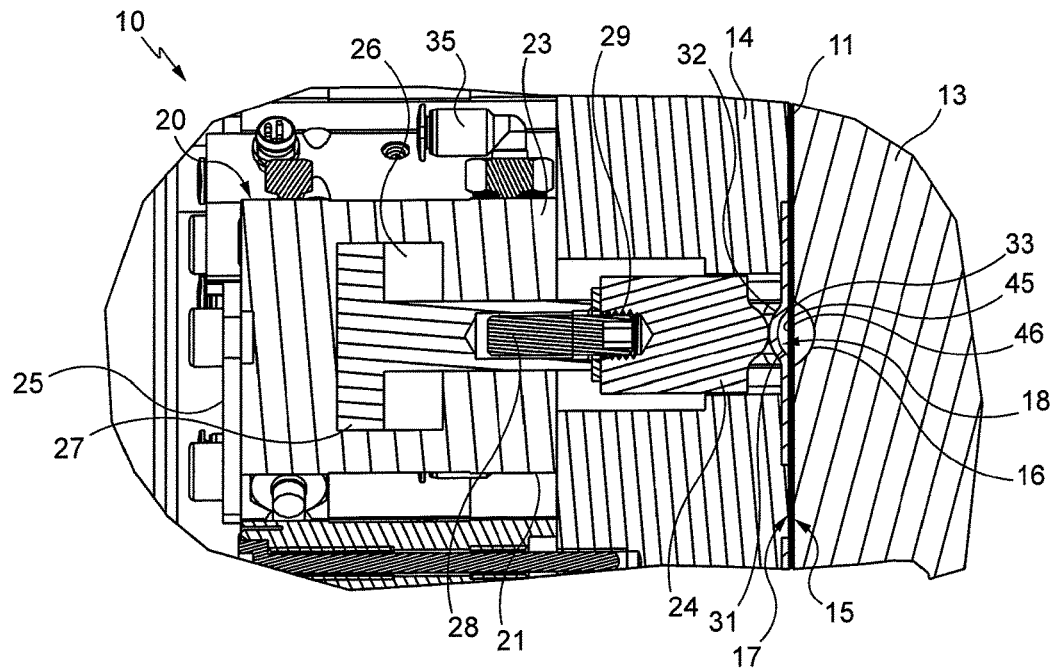
FIGS. 2 to 4 are cross-section views of the circuit for biological liquid of FIG. 1, respectively with an open valve and pipes not yet formed, with an open valve and formed pipes, and with a closed valve.
Figure 3:
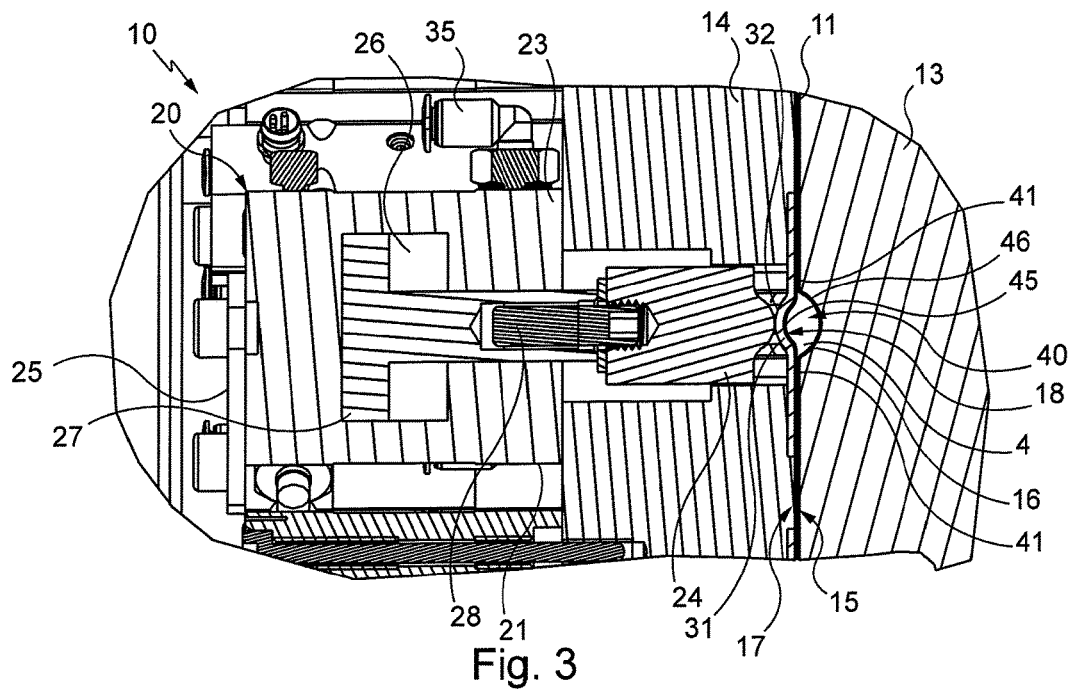

FIGS. 1 to 4 illustrate a press 10 and a bag 11 which make it possible to obtain a circuit 1 for treatment of a biological liquid comprising a plurality of connectors for liquid 2 and a network 3 for routing liquid between those connectors 2, of which a pipe 4 is visible in FIG. 3.

The press 10 comprises two shells 13 and 14, also respectively called second shell and first shell.

The shells 13 and 14 are each formed from a sold block of stiff material. Here, the shells 13 and 14 are of plastics material and are each of generally parallelepiped shape.

Shell 13 has a reference surface 15, which is flat here, and a plurality of shaping channels 16 recessed into surface 15.

The shell 14 has a reference surface 17 and shaping channels 18 recessed relative to surface 17, each facing a corresponding shaping channel 16.

Generally, the surfaces 15 and 17 have similar dimensions and the arrangement of the shaping channels 18 is to a large extent the mirror image of the arrangement of the shaping channels 16.

The channels 16 and 18 are of generally semi-elliptical cross-section and have portions of variable cross-section (FIGS. 4 to 6), as will be seen below in more detail.

The surfaces 15 and 17 are configured such that, when they are applied against each, the channels 16 and 18 are in register with each other to delimit a network of cavities which are each generally tubular.

In addition to the shells 13 and 14, the press 10 comprises, here implanted on shell 14, pinch valves 20 (only one of which is visible in the drawings) each comprising an actuator 21 for pinching a pipe 4.

It should be noted that the press 10 further comprises sensors (not shown) of a physico-chemical value, for example pressure or temperature. It is also to be noted that each sensor (not shown) is fastened to the shell 14 in register with a channel 18, with the distal end of the sensor emerging into that channel 18, without actually having to touch the fluid. Such sensors are well known and comprise for example pressure sensors which measure the pressure via the outer surface of the bag. It will be noted that, at the location of the sensor, to enable the putting in place thereof, the shaping channel 18 is not exactly the mirror image of the channel 16.

As can be seen in FIGS. 2 to 4 and 13, each actuator 21 is similar to a double-acting type jack, here pneumatic, comprising a first connector 34 and a second connector 35.

Figure 4:
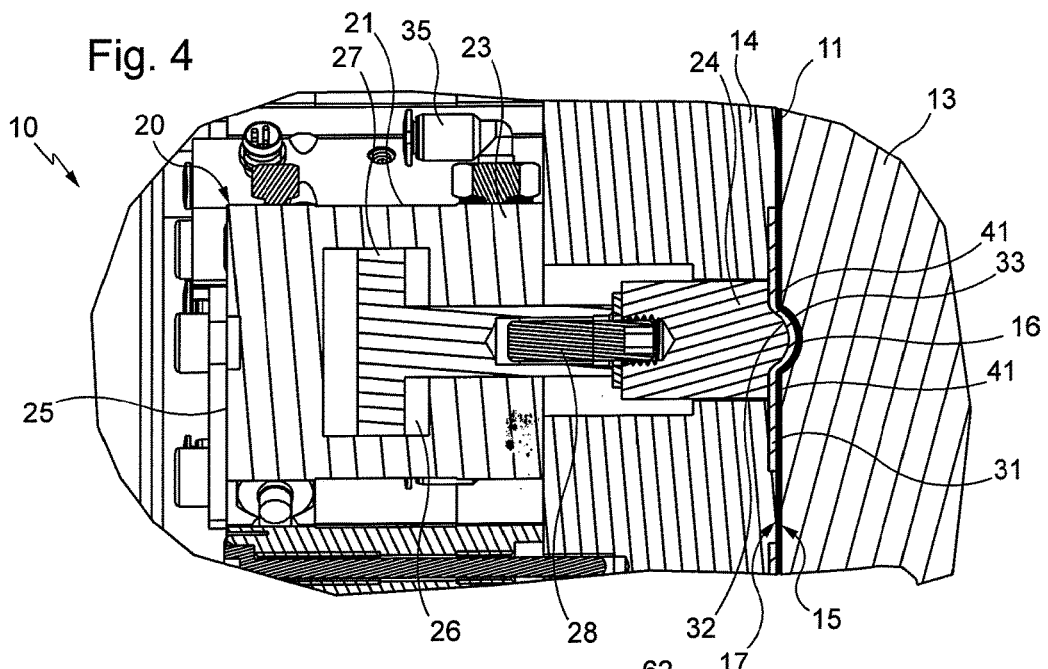

Each actuator 21 further comprises a body 23 fastened to the shell 14 (in a manner described below) and a moveable pinching finger 24 having a retracted position when the valve 20 is in an open position (see FIGS. 2 and 3), and an extended position when the valve 20 is in a closed position (see FIG. 4).

The body 23 is housed in a recess 25 of shell 14.

The body 23 has a front face 22 from which four rods 36 project (only three of which are visible in FIG. 13), which rods 36 are inserted into apertures (not shown) formed in the body of the shell 14 in order to fasten the body 23 of the actuator 21 to the shell 14.

The body 23 furthermore has two opposite sides on each of which are formed two guide grooves 37 which extend longitudinally (from the front face 22 to a back face 39 which is an opposite face to the front face 22). Between the two pairs of grooves 37 there are respectively formed two guide slides 38 for the mounting of the body 23 of the actuator 21 in the recess 25 of the shell 14, which shell comprises complementary guide members (not shown) configured to cooperate with the grooves 37 and the slides 38 of body 23.

From the front face 22 of the body 23 there projects furthermore a head 28 a free end of which is bored with a tapped hole 29 (FIG. 2) into which the movable finger 29 screws.

The body 23 further comprises a pneumatic chamber 26 and a piston 27 which is mechanically connected to the head 28.

The first connector 34 of the actuator 21 is configured to pressurize a first portion of the pneumatic chamber 26, so as to urge the piston 27 from a first position towards an opposite second position. When the piston 27 is at the end of its first stroke (second position), the finger 24 is in retracted position (FIGS. 2 and 3). Of course, the second connector 35 is then configured to have what is referred to as an exhaust role in relation to the second portion of the pneumatic chamber 26, that second portion being an opposite portion to the first portion.

That second connector 35 is furthermore configured to pressurize (inlet role) the second portion of the pneumatic chamber 26, which is an opposite portion to the first portion, to urge the piston 27 from the second position towards the first position. When the piston 27 is at the end of its second stroke (first position), the movable finger 24 is in extended position (FIG. 4). Of course, the first connector 34 is then configured to have what is referred to as an exhaust role in relation to the first portion of the pneumatic chamber 26

It will be noted that in the retracted position, the movable finger 24 is disposed in the body of the shell 14, whereas in the extended position, the movable finger 24 projects into the channel 18.

As illustrated in FIGS. 13 to 17, the movable pinching finger 24 is of aluminum and comprises a base 78 having a cylindrical outline and a body 79 which rests on a face 87 of the base 78 at one end of that body 79, and which extends from the base 78 to an opposite pointed end 83, also called first distal end of the finger 24.

As will be seen below, that pointed end 83 of the body 79 is shaped like the shaping channel 16 of the shell 13.

The movable pinching finger 24 further comprises two pinching arms 82 which each rest on the face 87 of the base 78 and which extend along two opposite sides of the body 79 (that is to say laterally) almost to the pointed end 83 of the body 79.

These two pinching arms 82 form substantially straight, upright members, each provided with a flat end 84, also called second distal end of the finger 24, situated set back relative to the pointed end 83 of the body 79.

As will be seen below, these flat ends 84 of the two pinching arms 82 are shaped like the shell 13, outside of and in immediate proximity to its shaping channel 16, that is to say like the reference surface 15 of the shell 13.

The movable pinching finger 24 further comprises two main lateral pinching walls 80 which each rest in part on the face 87 of the base 78 and which extend along two other opposite sides of the body 79 (that is to say laterally but on different sides to the sides where the arms 82 are formed) to the pointed end 83 of the body 79.

These two main lateral pinching walls 80 form lateral extensions of the body 79 each provided with a beveled end 85 extending set back from and away from the pointed end 83 of the body 79 to meet that pointed end 83 thereby to form an extension thereof.

As will be seen below, these beveled ends 85 are partially shaped like the shaping channel 16 of the shell 13.

The movable pinching finger 24 further comprises four lateral secondary pinching walls 81 which each rest on the face 87 of the base 78 and which extend in pairs along the same two other opposite sides of the body 79 (that is to say laterally but on different sides to the sides where the arms 82 are formed), to the base of the pointed end 83 of the body 79, at the location of a junction between that pointed end 83 and the flat ends 84 of the arms 82.

It will be noted that each main lateral pinching wall 80 is disposed between a pair of secondary lateral pinching walls 81.

These four secondary lateral pinching walls 81 form lateral wings of the body 79 each provided with a beveled end 86 extending set back from and away from the pointed end 83 of the body 79 to meet the base of the pointed end 83.

As will be seen below, these beveled ends 86 are partially shaped like the shaping channel 16 of the shell 13.

The valve 20 further comprises, in register with the moveable finger 24, an elastically compressible pad 31, which pad 31 forms part of an individual local plate 30 (shown in isolation in FIGS. 8 to 12) of silicone molded in one piece.

The pad 31 has a first face 32 adjacent the movable finger 24 and a second face 33 adjacent the pipe to pinch 4, the second face 33 of the pad 31 being concave and locally delimiting the shaping channel 18 of the shell 14.

As can best be seen in FIGS. 8 to 12, the plate 30 comprises a generally arcuate curved central portion 74, two generally arcuate curved transverse walls 75 formed on respective opposite sides of the central portion 74, as well as two flat lateral walls 70 formed along the lateral portion 74 and the two transverse walls 75.

The two transverse walls 75 and the two flat walls 70 surround the central portion 74, which essentially forms the pad 31.

The two transverse walls 75 and the central portion 74 extend in the same general direction corresponding to the direction in which the pipe to pinch 4 extends.

The transverse walls 75 have a first cross-section referred to as wide and the central portion 74 has a second cross-section referred to as smaller relative to the first cross-section.

Each transverse wall 75 has a straight portion 71 of substantially constant wide cross-section and two end portions 72 disposed at respective opposite ends of the straight portion 71, which end portions 72 are of varying cross-cross-section. More particularly, the end portions 72 have a wide cross-section at the respective junction with the straight portion 71 and a smaller cross-section respectively at the junction with the central portion 74 of the plate (which has a smaller cross-section, less than the cross-section of the pipe to pinch 4), and at its free end (where the cross-section is approximately equal to the cross-section of the pipe to pinch 4).

The individual local plate 30 further comprises two fastening lugs 73 positioned on the same side as the first face 32 and projecting from the transverse walls 75. More particularly, the two fastening lugs 73 project in part from the straight portions 71 and from the end portions 72 farthest away from the central portion 74 of the plate.

Figure 6:
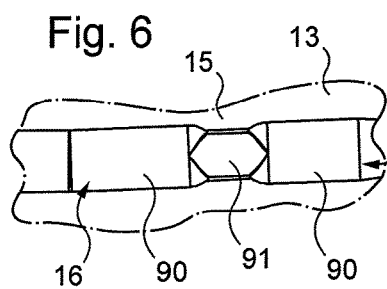
FIG. 6 is a view in elevation of a portion of the other of the shells of the circuit of FIGS. 2 to 4, which portion is configured to face the portion of the shell illustrated in FIG. 5.

As can be seen in FIG. 6, the shaping channel 16 of the shell 13 has, at the location of the pipe to pinch 4, a central portion 91 of smaller cross-section opposite the central portion 74 of the plate 30 and two lateral portions 90 of wide cross-section formed at respective opposite ends of the smaller cross-section central portion 91 and disposed opposite the transverse walls 75 of the plate 30.

In immediate proximity to the smaller cross-section central portion 91 of the shaping channel 16 is located the reference surface 15 of the shell 3, which surface 15 is flat and configured to receive, bearing upon it, the two flat walls 70 of the plate 30, on respective opposite sides of the smaller cross-section central portion 91.

It should be noted that the smaller cross-section central portion 91 of the shell 13 and the central portion 74 of the plate 30 are substantially of the same cross-section whereas the two wide cross-section lateral portions 90 of the shell 13 are of substantially smaller cross-section than the wider cross-section of the transverse walls 75 of the plate 30 (at the location of their respective straight portion 72).

Figure 5:
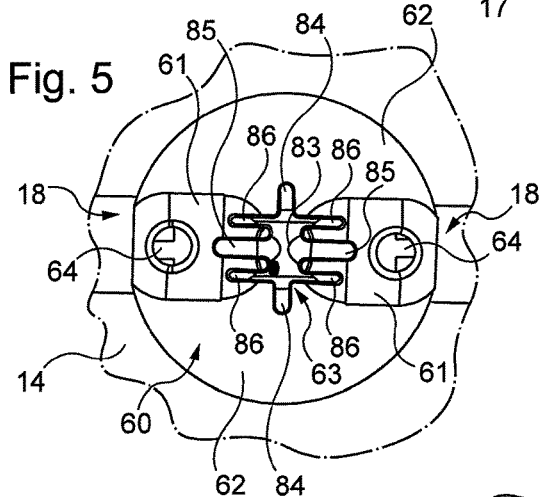
FIG. 5 is a view in elevation of a portion of one of the shells of the circuit of FIGS. 2 to 4.
Figure 7:
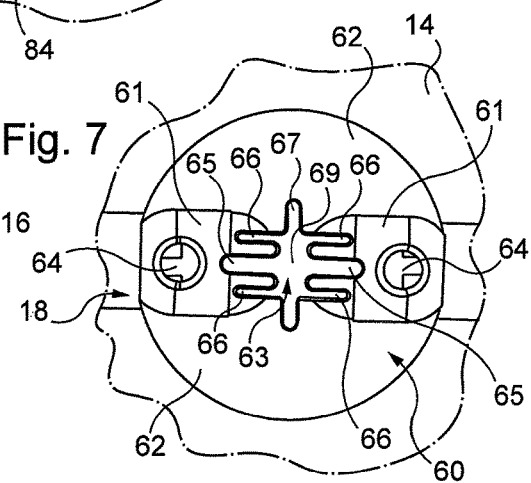
FIG. 7 is an elevation view of the portion of the shell visible in FIG. 5, here having an accommodation for an elastically compressible pad.
Figure 8:
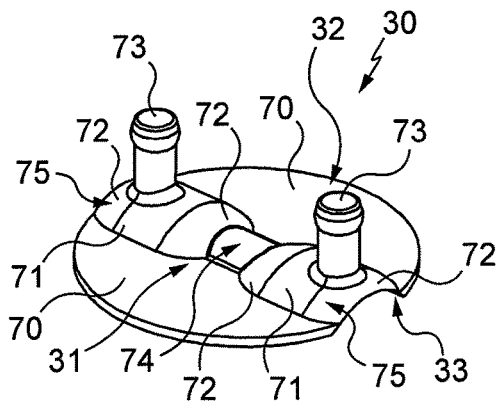
FIGS. 8 to 12 are views, respectively, in perspective, of a first side, of a second side turned through 90° relative to the first side, of the front and of the back of the elastically compressible pad.
Figure 9:
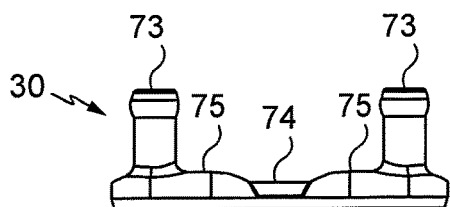
Figure 10:
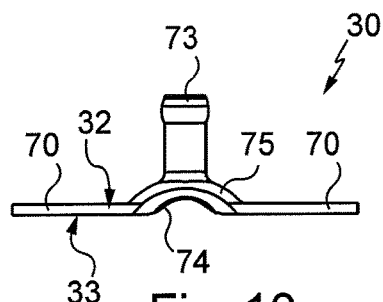
Figure 11:
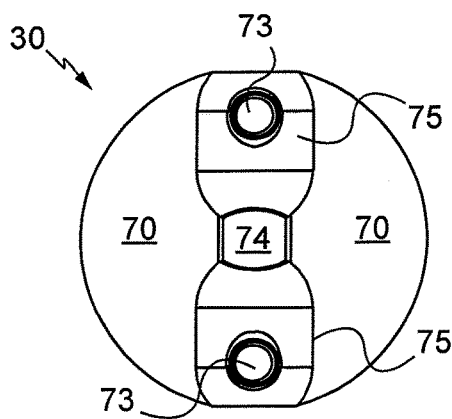
Figure 12:
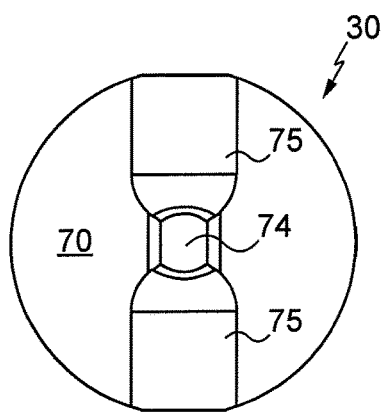
Figure 13:
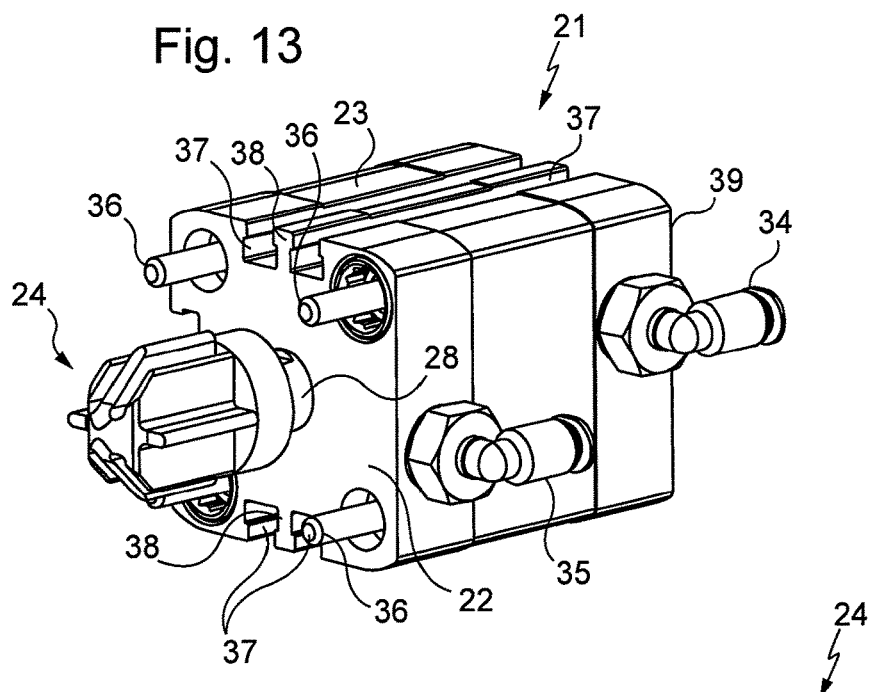
FIG. 13 is a perspective view in isolation of an actuator of the valve visible in FIGS. 2 to 4.
Figure 14:
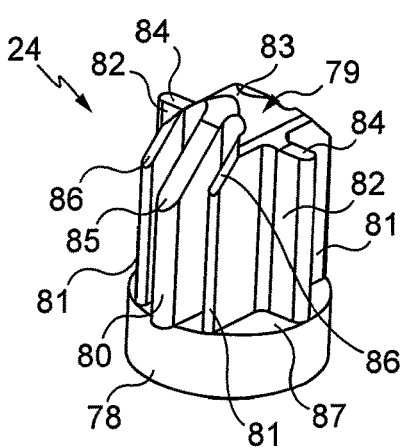
FIGS. 14 to 17 are views, respectively, in perspective, of a first side, of a second side turned through 90° relative to the first side and from above of a movable pinching member of said actuator illustrated in FIG. 13.
Figure 15:
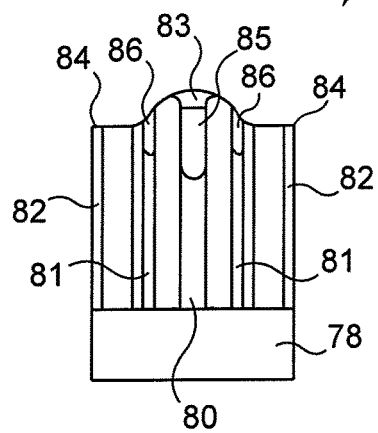
Figure 16:
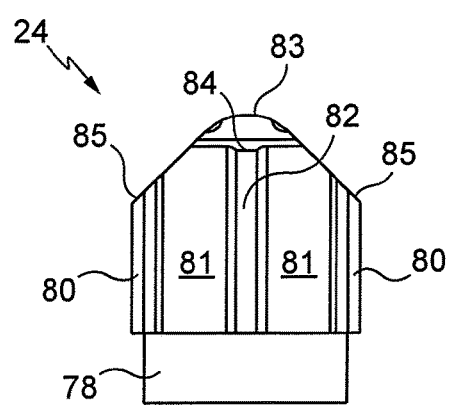
Figure 17:
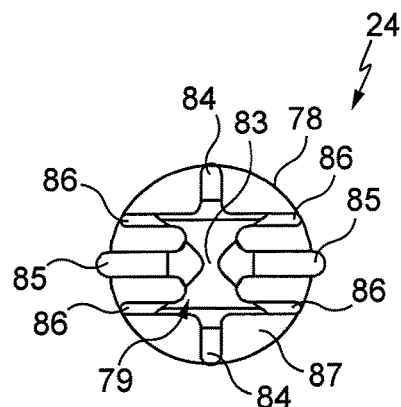

As can be seen in FIGS. 5 and 7, the shell 14 comprises a recessed accommodation 60 configured to receive the plate 30, which accommodation 60 has a curved central portion 61 and two flat lateral portions 62.

The shell 14 furthermore has a central aperture formed by a window 63 (or cut-out) which opens into the recessed accommodation 60, which window 63 is configured to allow the finger 24 of the actuator 21 to pass (and thus to be passed through) when the latter is in its extended position.

The curved central portion 61 has at the center a smaller cross-section portion (hidden here by the window 63) and at respective opposite ends of that smaller cross-section portion (and in line therewith), two widened portions which each have a straight portion of substantially constant wide cross-section and two end portions disposed at respective opposite ends of the straight portion and which are of varying cross-section, like the end portions 72 of the transverse walls 75 of the plate 30.

The shell 14 furthermore has two apertures 64 opening into the recessed accommodation 60 at the location of the curved central portions 61.

The window 63 opens at the center of the curved central portion 61 and has a central hole 69 provided to allow passage of the pointed end 83 of the body 79 of the finger 24, two holes 67 for pinching flat provided to allow passage of the flat ends 84 of the two pinching arms 82 of the finger 24, two main lateral holes 65 provided to allow passage of the beveled ends 85 of the two main lateral pinching walls 80 of the finger 24, as well as four secondary lateral holes 66 provided to allow passage of the beveled ends 86 of the four secondary lateral pinching walls 81 of the finger 24.

More generally, the recessed housing 60 is of complementary general shape to the shape of the plate 30, the apertures 64 are of complementary general shape to the fastening lugs 73 of the plate 30 and the window 63 is of a shape enabling passage of the movable finger 24.

Thus, each flat lateral wall 70 of the plate 30 is positioned on a flat lateral portion 62 of the accommodation 60 in the shell 14, each arcuate transverse wall 75 of the plate 30 is positioned on the curved central portion 61 of the accommodation 60 in the shell 14, the central portion 74 of the plate 30 being positioned at the center of the curved central portion 61 opposite to window 63 and with the fastening lugs 73 of the plate 30 being inserted and fastened into the apertures 64 of the shell 14.

The bag 11 comprises two flexible films 45 and 46 attached to each other by a seal delimiting a closed contour.

Here, each of the films 45 and 46 is a PureFlex™ film from the applicant. This is a co-extruded film comprising four layers, respectively, from the inside to the outside, a layer of ultra low density polyethylene (ULDPE) forming the material for contact with the liquid, a copolymer of ethylene and vinyl alcohol (EVOH) forming a barrier to gases, a copolymer layer of ethylene and vinyl acetate (EVA) and a layer of ultra low density polyethylene (ULDPE) forming the outer layers.

The seal is a main weld bead formed at the periphery of the films 45 and 46.

In addition to this main weld bead, the bag 11 comprises a plurality of secondary weld beads formed in what is referred to as a treatment zone of the bag 11 to seal the films 45 and 46 according to a predetermined architecture defining the liquid routing network forming the pipes 4.

In addition to the films 45 and 46 and the connectors 2 for liquid, the bag 11 comprises a connector for a pneumatic agent 5 to form the pipes 4.

The dimensions of the bag 11 correspond to those of the surfaces 15 and 17 of the shells 13 and 14.

The bag 11 is intended to be clamped by the shells 13 and 14 with one of the faces of the bag 11 in contact with a face of the shell 13 (this face having the surface 15 and the channels 16), and with the other face of the bag 11 being in contact with a face of the shell 14 (this face presenting surface 17 and the channels 18).

FIG. 1 shows the bag 11 in place between the shells 13 and 14, with the surface 15 in contact with the bag 11, but without the shells 13 and 14 being clamped against each other (pre-closure position).

The bag 11 is then "inflated": the connectors 2 for liquid are obturated and a pneumatic agent is injected by the connector 5 provided for that purpose.

The effect of the inflation of the bag 11 is that the films 45 and 46, at the location of the pipes 4, respectively conform to the face of the shell 13 which presents the surface 15 and the channels 16, and the second face 33 of the pad 31.

The press 10 is then closed, that is to say that the shells 13 and 14 are pressed against each other while sandwiching the bag 11 (closed position in which the bag 11 is clamped between the shells 13 and 14).

The films 45 and 46 are then pressed against the face of the shell 13 which presents the surface 15 and the channels 16, and the second face 33 of the pad 31, at the location of the channels 16 and 18 where they form the pipes 4 of elliptical contour, as shown in FIG. 3.

The press 10 and the bag 11 then form a circuit 1 for treating a biological liquid which is ready to be placed in service.

In this position, each pipe 4 comprises a flow passage 40 for biological liquid formed by the films 45 and 46 of the bag 11 at the place where those films are apart from each other, and by the edges 41 in immediate proximity to the passage 40, which edges 41 are formed by the films 45 and 46 of the bag 11 where those films meet and are sealed by a respective secondary weld bead.

To simplify the drawings, the shells 13 and 14 have been illustrated in the same position in FIGS. 1 to 3 but, as indicated above, in the pre-closure position illustrated in FIG. 1, the shells 13 and 14 are not clamped against each other.

When the biological liquid to treat in the circuit formed by the press 10 and the bag 11 has to be protected from contamination, the bag 11 is provided with obturating plugs in place on each of the connectors for liquid and on the connector for a pneumatic agent and it is sterilized, for example by gamma irradiation. The pneumatic agent injected inside the bag 11 is purified.

For example, the pneumatic agent is compressed air purified by a hydrophobic filter, such as an AERVENT® available from the company Millipore, connected to the inflating connector 5.

It should be noted that the sensors (not shown) have their distal end (sensitive end) in contact with a pipe 4.

Each sensor makes it possible to know a physico-chemical characteristic of the liquid flowing in the pipe 4 with which its distal end is in contact, for example its temperature or its pressure.

Each actuator 21 enables a pipe 4 to be pinched between its moveable finger 24 and shell 13, to allow or prevent the passage of the liquid at that location.

To pinch the pipe 4, the valve 20 passes from its open position (FIG. 3) in which the moveable finger 24 is in a retracted position in which it does not pinch the pipe 4, to its closed position (FIG. 4) in which the moveable finger 24 is in an extended position in which it pinches the pipe 4.

The finger 24, at the time it is extended, pushes the pad 31 towards the shaping channel 16 of the shell 13.

Thus, the pad 31 passes from a resting configuration in which its second face 33 is concave and locally delimits the shaping channel 18 of the shell 14 of the pipe 4 to pinch, to a pinching configuration in which its second face 33 is convex, with the pipe 4 and the pad 31 sandwiched between the shaping channel 16 of the shell 13 of the pipe 4 to pinch and the moveable pinching finger 24.

More particularly, the pointed end 83 comes to push the central portion 74, at least at its center, of the plate 30 (in other words of the pad 31), then to push the film 45 towards the film 46 of the bag 11 until they are against the central portion of smaller cross-section 91, at least at its center, of the shaping channel 16 of the shell 13, thus obturating the passage 40 of the pipe 4.

At the same time, the beveled ends 85 and 86 of the respective main and secondary lateral walls 80 and 81 also come to push that central portion 74, at least partly on its edges, then to push the film 45 towards the film 46 of the bag 11 until those films are against the smaller cross-section central portion 91, at least partly on its edges, of the shaping channel 16 of the shell 13, thereby making the obturation of the passage 40 of the pipe 4 secure.

At the same time, the flat ends 84 of the pinching arms 82 come to push, or at least to bear upon, the flat lateral walls 70 of the plate, in immediate proximity to the central portion 74, then to push, or at least to bear upon, the films 45 and 46 of the bag 11 until those films are against the reference surface 15 of the shell 13, in immediate proximity to the smaller cross-section central portion 91, providing the support without stretching (or at least considerably limiting the stretching) of the films 45 and 46 at the location of the secondary weld beads at the edges 41 of the pipe 4.

By virtue of the pointed edge 83 of the body 79 of the finger 24 which is shaped to pinch the passage 40 of said pipe 4 to pinch and the flat ends 84 of the pinching arms 82 of the finger 24 which are shaped to pinch flat the edges 41 of the pipe 4 to pinch, the finger 24 is thereby configured to push the central portion 74 of the pad 31 and the passage 40 of the pipe 4 to pinch towards the shaping channel 16 of the shell 13 and the edges 41 of said pipe 4 to pinch towards the reference surface 15 of the shell 13, outside of and in immediate proximity to its shaping channel 16.

It should be noted that, by virtue of its compressibility, the pad 31 makes it possible to make up possible differences in shape between the finger 24 and the smaller cross-section central portion 91 of the shaping channel 16 of the shell 13.

By virtue of the elastically compressible pad 31 and the movable finger 24, both films 45 and 46 of the pipe 4 are thus applied sealingly against each other at the location of the passage 40 and the liquid can no longer flow in the pipe 4, with no risk of pulling away the edges 41 of that pipe 4 since they are pinched flat.

Figure 18:
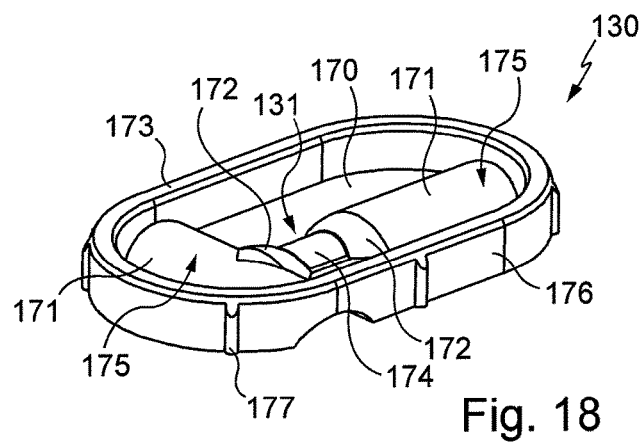
FIGS. 18 to 20 show, from different viewing angles, a variant embodiment of the elastically compressible pad.
Figure 19:
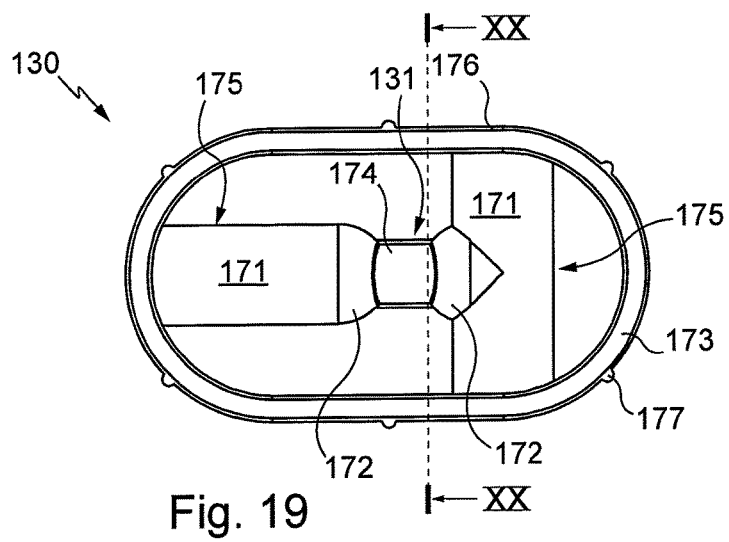
Figure 20:
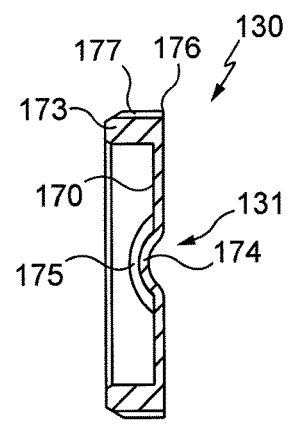

FIGS. 18 to 20 illustrate a variant embodiment of the pad and more generally of the plate.

Generally, the same reference numbers increased by 100 are used for similar parts.

Just as for the plate 30 illustrated in FIGS. 8 to 12, the plate 130 comprises a generally arcuate curved central portion 174 and generally arcuate curved transverse walls 175 formed on respective opposite ends of the central portion 174, as well as two flat lateral walls 170.

The transverse walls 175 and the two flat walls 170 surround the central portion 174, which essentially forms the pad 131.

Contrary to the plate 30 illustrated in FIGS. 8 to 12, the plate 130 comprises a peripheral curb 173 forming a fastening device, in other words replacing the fastening lugs 73 of the plate 73.

This curb 173 has a periphery 176 on which is formed a plurality of positioning ribs 177 regularly spaced around the periphery 176.

Furthermore, one of the transverse walls 75 extends in the same general direction as the flat portion 174 and the other of the transverse walls 175 extends radially.

Each transverse wall 175 has a straight portion 171 of substantially constant wide cross-section and an end portion 172 of variable cross-section, and more particularly of wide cross-section at the respective junction with the straight portion 171 and of smaller cross-section at the junction with the central portion 174 of the plate 130.

Here, the plate 130 thus comprises several transverse walls 175 which meet at the location of a distinct junction of said central portion 174.

It should be noted that the shell in which is disposed the pinch valve has a recessed accommodation the shape of which is complementary with the plate 130 as well as a groove provided to receive at least partly the peripheral curb for the fastening of the plate 130 onto that shell; that the shaping channel of that shell and that the shaping channel of the other shell each have an arrangement which is substantially the mirror image of the arrangement of the transverse walls 175 and of the central wall 174 of the plate 130.

Figure 21:
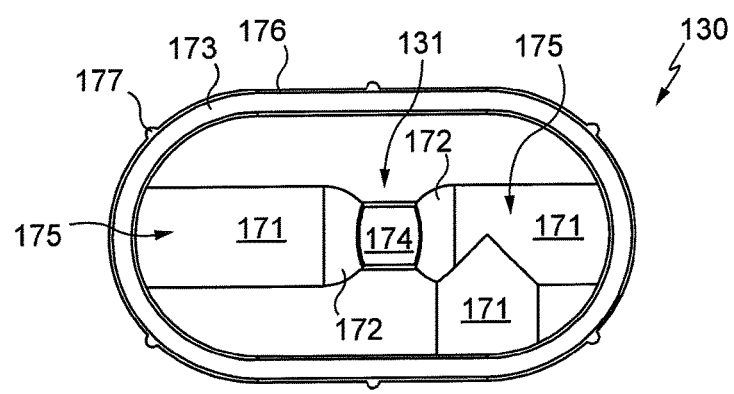
FIG. 21 is a view from above of another variant of the elastically compressible pad.

FIG. 21 illustrates another variant embodiment of the pad and more generally of the plate, which shows a plate 130 having an arrangement of the transverse walls 175 and of the central wall 174 other than the plate illustrated in FIGS. 18 to 20, but still having several transverse walls 175 which meet at the location of a distinct junction of said central portion 174.

In variants that are not illustrated:
the shell 13 does not have a channel with a central portion of narrower cross-section, but rather a channel of constant wide cross-section;
the pipe to pinch has a circular contour rather than elliptical;
the movable member of the actuator comprises more or fewer lateral walls (main and/or secondary);
the movable member of the actuator comprises more than two pinching arms, for example three or four;
rather than being dispersed over the same shells, the sensor or sensors of a physico-chemical value and the pad are disposed on different shells; and/or no sensor is provided;
instead of being in one piece, the shells are formed by a set of modular members associated with each other to delimit the different portions of the circuit, which members are provided with marks or labels to ensure that they are correctly disposed relative to each other, the marks and the labels comprising for example reference numbers or codes, and possibly being of the RFID type.
the shells are of a material other than plastics material, for example of stainless steel, of aluminum, of ceramic or of wood;
the movable finger of the actuator is of a material other than aluminum, for example of plastics material, of stainless steel, of ceramic or of wood;
the films of the bag are of a material other than the PureFlex™ film, for example of another film with several layers compatible with biological liquids such as the film HyQ® CX5-14 available from the company Hyclone industries, or the film Platinum UltraPac available from the company Lonza;
the double-acting pneumatic jack serving to actuate the finger is replaced by a single-acting pneumatic jack, comprising a return spring for return of the piston, or the jack is of a kind other than pneumatic, for example electric; and/or
the pad is not a one-piece molding.

It should be noted more generally that the invention is not limited to the examples described and represented.

The invention claimed is:

1. A circuit for biological liquid, comprising a plurality of connectors, a network for routing liquid between said connectors, a bag comprising two flexible films and said routing network connectors, and a press comprising a first shell and a second shell clamping said bag in a state in which pipes of said liquid routing network are formed between said films, said first shell comprising for each said pipe a shaping channel, said second shell comprising for each said pipe a shaping channel facing said corresponding shaping channel of the first shell; said first shell comprising at least one pinch valve for a said pipe, which valve comprises an actuator comprising a movable pinching member and has an open position in which the moveable member is in a retracted position in which it does not pinch said pipe as well as a closed position in which the moveable member is in an extended position in which it pinches said pipe; said movable pinching member moving between said open position and said retracted position along an axial moving axis and comprising a finger comprising a body provided with a pointed end, at least one pinching arm which extends laterally along said body and which is provided with a flat end that is perpendicular to said moving axis and at least one lateral pinching wall which extends along said body and has a beveled end meeting said pointed end; said valve further comprising, in register with said moveable pinching member, an elastically compressible pad, which pad has a first face adjacent the moveable member and a second face adjacent the pipe to pinch, and, when said valve is in an open position, has a resting configuration in which said second face is concave and locally delimits said first shell shaping channel of said pipe to pinch, and, when said valve is in a closed position, has a pinching configuration in which said second face is convex, with said pipe and said pad sandwiched between said second shell shaping channel of said pipe to pinch and said moveable pinching member;
wherein said pipe to pinch has a routing passage for said biological liquid and edges formed on each side of said passage delimiting the latter; said movable pinching member and said elastically compressible pad being configured such that, when said pinch valve is in a closed position and said pad in a pinching configuration, said routing passage of said pipe to pinch is pinched by said movable pinching member against said second shell shaping channel and said edges of said pipe to pinch are pinched flat by said flat end of said pinching arm of said movable pinching member against said second shell.

2. A circuit according to claim 1, wherein said passage of said pipe to pinch has an elliptical outline and both said flexible film meet and are sealed to each other at the location of said edges of said passage.

3. A circuit according to claim 1, wherein said pad forms part of an individual local plate.

4. A circuit according to claim 3, wherein said pad forms a central portion of said individual local plate, which comprises lateral and transverse walls which surround said central portion.

5. A circuit according to claim 4, wherein said lateral walls are flat whereas said central portion and said transverse walls are arcuately curved, with said transverse walls having a first section referred to as wide and said central portion which has a second section referred to as smaller relative to said first section.

6. A circuit according to claim 5, wherein said second shell shaping channel of said pipe to pinch has a central portion of smaller cross-section opposite said central portion of said individual local plate and two lateral portions of wide cross-section formed on respective opposite sides of said smaller cross-section central portion and opposite said transverse walls of said individual local plate.

7. A circuit according to claim 3, wherein said local individual plate comprises several transverse walls which meet at the location of a distinct junction of said central portion.

8. A circuit according to claim 1, wherein said first shell comprises a recessed accommodation configured to receive said pad at least partially.

9. A circuit according to claim 8, wherein said individual local plate comprises at least one fastening device fastened by shape complementarity in at least one corresponding aperture provided in the recessed accommodation of said first shell.

10. A circuit according to claim 9, wherein said individual local plate comprises two fastening lugs forming said fastening device, said fastening lugs projecting from the transverse walls.

11. A circuit according to claim 9, wherein said individual local plate comprises a peripheral curb forming said fastening device, said curb being provided with a periphery on which is formed at least one positioning rib.

12. A circuit according to claim 1, wherein said pad is formed from elastically compressible flexible plastic molded in one piece, in particular of silicone.

13. A circuit according to claim 1, wherein said finger has a first distal end shaped like the second shell shaping channel and a second distal end shaped like said second shell, outside of and in immediate proximity to said second shell shaping channel, said finger being configured to push said pad and said passage of said pipe towards said second shell shaping channel and said edges of said pipe towards said second shell, outside of and in immediate proximity to said second shell shaping channel.

14. A circuit according to claim 1, wherein said finger further comprises a base from which extends said body, at the location of an opposite end of said body to said pointed end, said at least one pinching arm and/or said at least one lateral pinching wall resting on said base.

15. A circuit according to claim 13, wherein said first shell comprises a window opening into a recessed accommodation formed in said first shell, said window being configured to allow said movable pinching member to pass when the latter is in its extended position.

16. A circuit according to claim 2, wherein said pad forms part of an individual local plate.

17. A circuit according to claim 16, wherein said pad forms a central portion of said individual local plate, which comprises lateral and transverse walls which surround said central portion.

18. A circuit according to claim 17, wherein said lateral walls are flat whereas said central portion and said transverse walls are arcuately curved, with said transverse walls having a first section referred to as wide and said central portion which has a second section referred to as smaller relative to said first section.

19. A circuit according to claim 18, wherein said second shell shaping channel of said pipe to pinch has a central portion of smaller cross-section opposite said central portion of said individual local plate and two lateral portions of wide cross-section formed on respective opposite sides of said smaller cross-section central portion and opposite said transverse walls of said individual local plate.

20. A circuit according to claim 16, wherein said local individual plate comprises several transverse walls which meet at the location of a distinct junction of said central portion.

21. A circuit according to claim 2, wherein said first shell comprises a recessed accommodation configured to receive said pad at least partially.

22. A circuit according to claim 21, wherein said individual local plate comprises at least one fastening device fastened by shape complementarity in at least one corresponding aperture provided in the recessed accommodation of said first shell.

23. A circuit according to claim 2, wherein said pad is formed from elastically compressible flexible plastic molded in one piece.

24. A circuit according to claim 2, wherein said movable pinching member of said actuator comprises a finger having a first distal end shaped like the second shell shaping channel and a second distal end shaped like said second shell, outside of and in immediate proximity to said second shell shaping channel, said finger being configured to push said pad and said passage of said pipe towards said second shell shaping channel and said edges of said pipe towards said second shell, outside of and in immediate proximity to said second shell shaping channel.

25. A circuit according to claim 23, wherein said pad is formed from silicone.

\* \* \* \* \*